April 14, 1959     T. EVANS ET AL     2,881,581
FRAME CONSTRUCTION FOR TRACTOR MOUNTED IMPLEMENTS
Filed Jan. 24, 1957     3 Sheets-Sheet 1

INVENTORS
THOMAS EVANS
ROBERT R. ROTH
ALBERT B. HUBBARD
BY
Carlsen & Hagle
ATTORNEYS

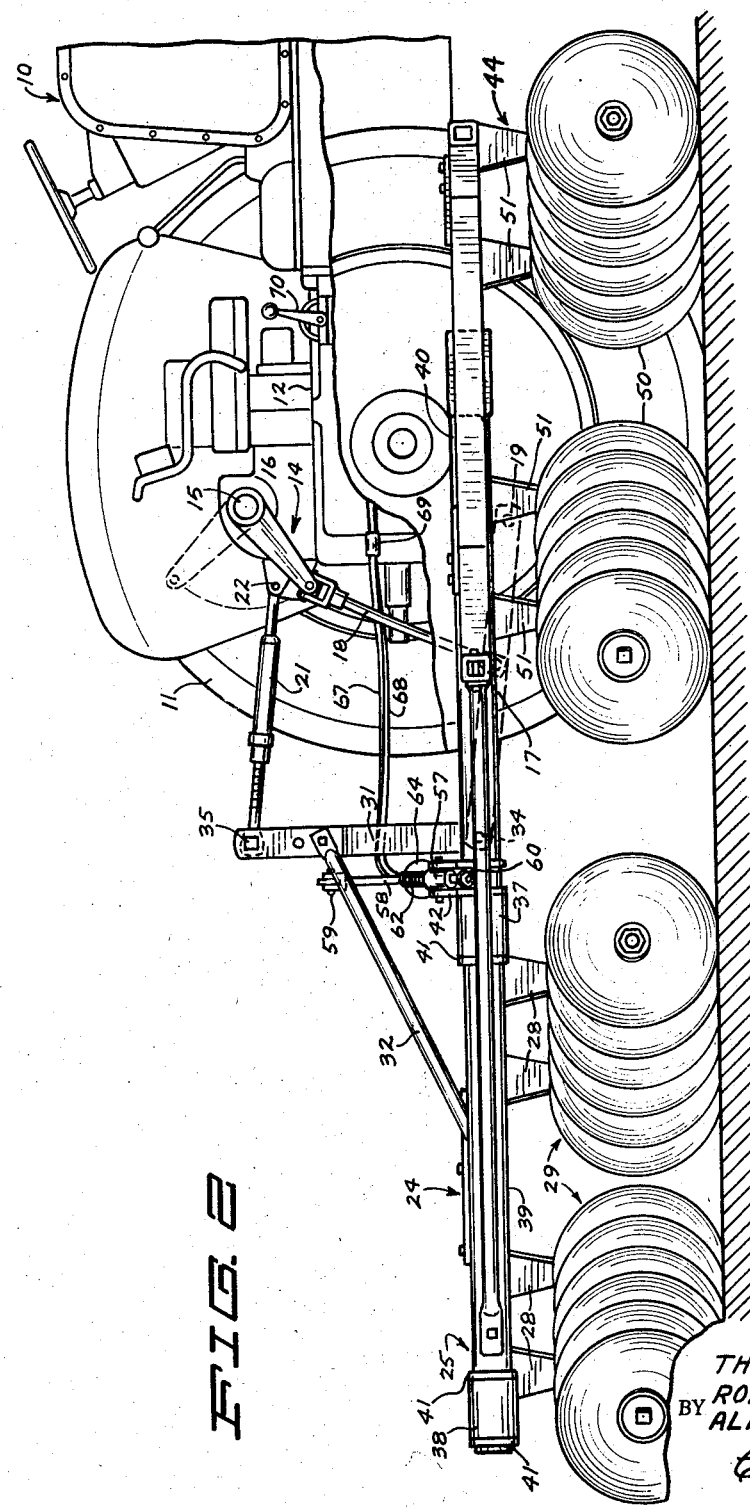

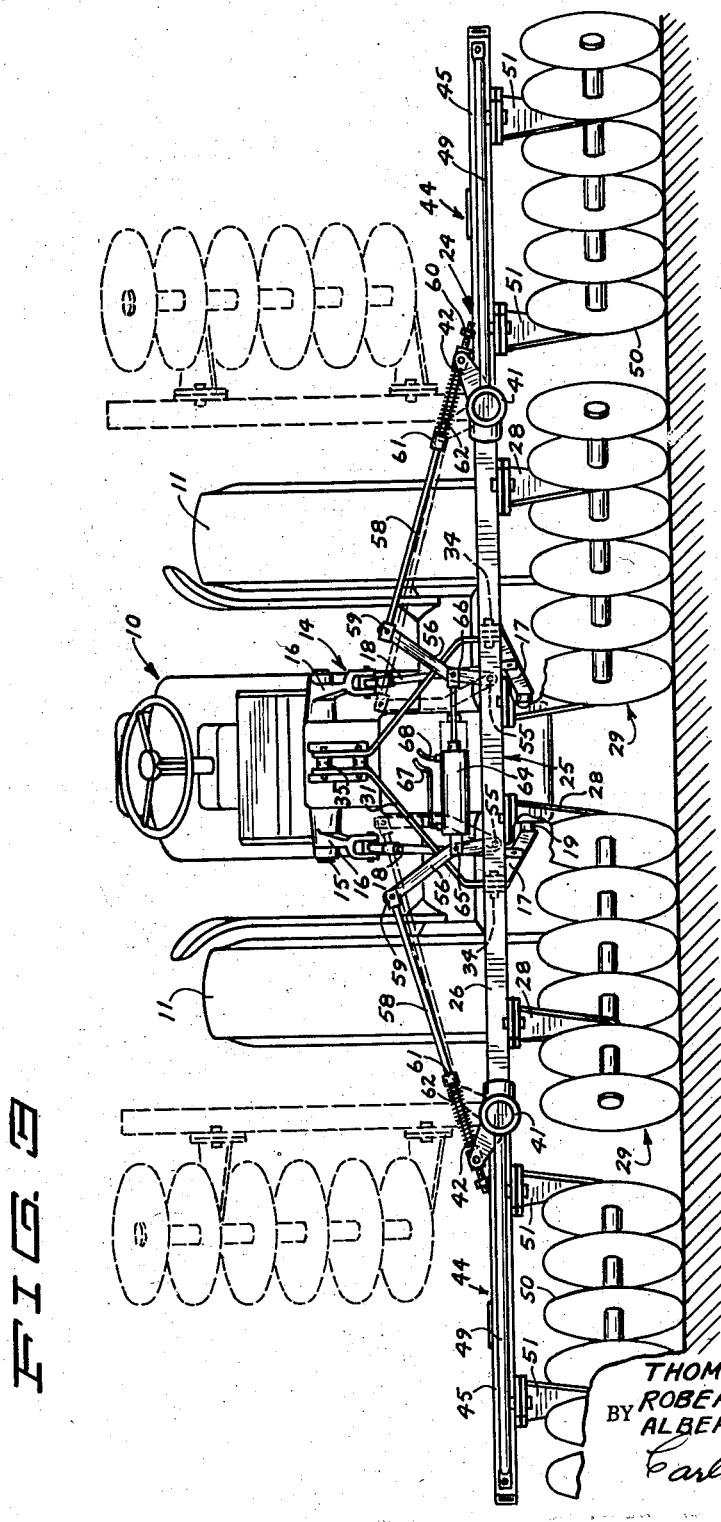

United States Patent Office 2,881,581
Patented Apr. 14, 1959

2,881,581

FRAME CONSTRUCTION FOR TRACTOR MOUNTED IMPLEMENTS

Thomas Evans and Robert R. Roth, Minneapolis, and Albert B. Hubbard, Victoria, Minn., assignors to Minneapolis-Moline Company, Hopkins, Minn., a corporation of Minnesota Application January 24, 1957, Serial No. 636,105

10 Claims. (Cl. 172—302)

This invention relates generally to agricultural implements and more particularly to such implements as are adapted to be attached to the rear end of a tractor to be drawn thereby.

Implements of the drawn type which are adapted to be hitched to the rear of a traction device are subject to certain practical restrictions as to size and weight. This is particularly true where the tractor hitch is of the powered type, such as the common "three point hitch," for picking up and lowering the implement between operative and transport positions. While it is desirable to connect four row implements to a tractor, the weight of such an implement renders use with a power hitch unsafe. Furthermore, an implement of extended width must have great lateral flexibility a characteristic which with present implement frame constructions does not lend itself well to use with tractor mounted power hitches.

The primary object of the present invention is to provide a new and improved construction for agricultural implements adapted to be hitched in draft relation to a tractor which construction allows an increase in the ground covering width of the implement without sacrificing adaptability of the implement to mounting on a tractor pick up hitch.

Another object of the invention is to provide an implement adapted for mounting on a tractor powered draft hitch which is so designed as to have its fore and aft center of gravity located approximately on the transverse line of connection between the hitch and the implement.

Another object of the invention is to provide a tractor and trailing draft implement combination wherein the implement is transversely sectional and said combination having means operable from the tractor for relatively collapsing the sections and raising them from the ground to a transport position.

Still another object of the invention is to provide a frame construction for an implement adapted to be hitched in trailing relation to a draft tractor which allows the ground working width of the implement to be substantially increased without sacrificing lateral flexibility or close working engagement of the implement with the ground through its ground width.

With the above mentioned and still additional objects in mind the invention broadly comprises an implement having a center frame adapted for connection with the trailing links of a tractor hitch for raising and lowering movement thereby, a pair of pivot tubes extending in fore and aft directions one at each side of the center frame and journaled thereon for oscillating movement about their longitudinal axes, each of said pivot tubes extending forwardly a substantial distance beyond the frame to provide a wing section support, a wing frame mounted on the wing section support of each beam to extend laterally outward therefrom, means connecting the wing frame with a power source on the draft tractor to raise the wing frame upwardly and inwardly about the axis of the tube, and said center frame and wing frames having sets of agricultural tools mounted thereon.

The above mentioned and still additional objects of the invention will be brought to light during the course of the following specification, reference being made to the accompanying drawings, in which—

Fig. 2 is a side elevation of the implement shown in Fig. 1.

Fig. 3 is a rear elevation of the tractor mounted implement shown in Fig. 1 and showing the transport position of the wing sections in broken lines.

Figure 1:
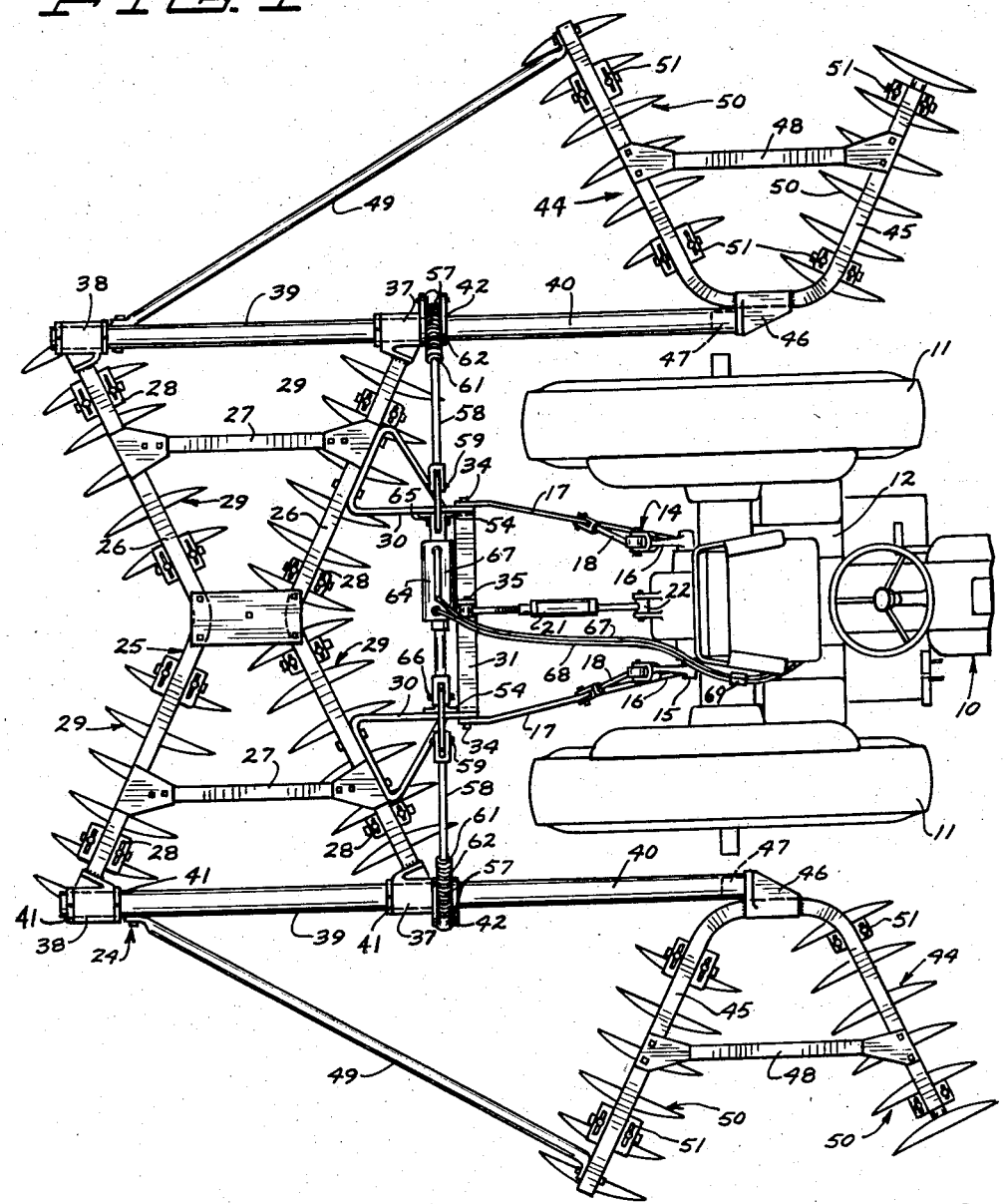
Fig. 1 is a plan view of a disk harrow embodying the improved construction and showing the harrow mounted on a tractor with the implement sections in ground working position.

Referring now more particularly to the drawings reference characters will be used to denote like parts or structural features in the different views. The number 10 denotes generally a conventional farm tractor having coaxial rear traction wheels 11 and an operator's platform 12 centered transversely between the wheels 11. The tractor shown is equipped at its rear end with a hydraulically operated pickup hitch designated generally at 14, and commonly referred to as a "3 point hitch." This hitch has a transverse rock shaft 15 which is suitably connected to a power source for limited rocking or oscillating movement about its axis. The shaft carries a pair of rearwardly extending transversely spaced crank arms 16 each of which is connected to a trailing forwardly pivoted draft link 17 by means of a lifting link 18. Links 17 are pivoted to the tractor chassis on a common transverse axis as at 19. A hitch top or tension link 21 has one end pivoted to the tractor as at 22. When the rear ends of links 17 and 21 are hitched to a trailing implement the rock shaft 15 may be operated about its axis to raise or lower the arms 16 and the draft links 17 to selectively raise or lower the implement between ground working and transport positions.

In the drawings the hitch is connected to the implement, designated generally at 24, in conventional manner. The implement 24 is of novel construction and such construction is the subject of the present invention. The implement has a main or center frame designated at 25 consisting of cross beams 26 rigidly interconnected by fore and aft beams 27. Attached to the frame by brackets 28 to work the ground therebelow are gangs 29 of tools. In the drawings these have been shown as harrowing disks although other tools may, of course, also be used.

A pair of supports 30 (Fig. 1) are rigidly mounted on the frame to extend forwardly therefrom in transversely spaced relation and these supports carry an upright hitch bracket 31 which is supported in a vertical position by means of braces 32 which extend rearwardly from the bar 31 to points on the frame 25. The members 26, 27, 30, 31 and 32 are accordingly all integrally related to make up the frame 25 which supports the gangs 29.

Hitch bracket 31 has a pair of oppositely and laterally projecting pins 34 which are adapted to be received in openings at the trailing ends of the draft links 17 and the upper end of the hitch bracket is apertured for connection thereof by bolt 35 to the trailing end of the tension link 21. As thus far described the hitch 14, frame 25 and their interconnection are of relatively conventional construction.

It will be noted in Figs. 1 and 3 that the frame 25 is transversely centered in trailing relation to the tractor 10 and that it is somewhat wider than the tractor to extend laterally beyond the tractor rear axle at each side of the tractor. At each side the frame 25 carries a pair of bearing sleeves in longitudinal alignment. These sleeves are designated as front bearing 37 and rear bearing 38 and they are respectively mounted at the ends of the front and rear cross members 26 of the frame 25. An elongated pivot tube or support 39 is journaled in each pair of bearings 37 and 38. The front portion 40 of each support 39 extends forwardly substantially beyond the bearing 37 and alongside the adjacent tractor wheel 11, the front end of the beam lying ahead of the tractor rear wheel axle. The support 39 is of tubular construction for rotation in the bearings 37 and 38 and has various lock collars 41 secured thereon on opposite sides of the bearing 38 and behind bearing 37 to prohibit endwise movement of the tube relative to the frame 25. Immediately ahead of bearing 37 the member 39 carries an upwardly projecting split crank arm 42 the attached portion of which is adapted to bear against the front end of the bearing.

The front end of each support shaft 39 is integrally attached to an implement section, designated generally at 44. This section has a tapered U-shaped frame 45 having the bight portion thereof welded to a mounting block 46. Block 46 has a cylindrical plug portion 47 which projects into the open end of tube 39 where it is anchored. A cross bar 48 integrally connects the two legs of the frame 45 which relatively diverge in their extension from the mounted central portion of the frame. A rigid brace bar 49 connects the frame 45 to the support tube 39 by extending from the outer end portion of the rearmost leg of the frame to a point on the pivot tube intermediate the bearings 37 and 38. Accordingly the frame 45 is integrally and rigidly associated with the support tube 39 for oscillating movement with the tube about its longitudinal axis. Each frame 45 carries a pair of disk harrow gangs 50 which are attached to the frame by means of depending mounting brackets 51.

Turning now to Fig. 1, it will be noted that a pair of arm brackets 54 are mounted in facing relation on the transversely spaced supports 30. To each of these supports there is pivoted as by pin 55 (Fig. 3) an arm 56 which extends upwardly from the pivot pin, the two arms angling outwardly in their upward extension. A slide collar 57 is pivoted in the bifurcated end of each crank arm 42. A rod 58 has one end pivoted to the upper end of arm 56 as at 59 and extends laterally outward therefrom through the collar 57 with a stop collar 60 fixed to its extended end. Another collar 61 is fixed on the rod 58 intermediate the pivot 59 and sleeve 57 and a spiral spring 62 encircles the rod and is held under compression between members 57 and 61.

A double acting remote hydraulic jack 64 is mounted in transverse horizontal position between the lever arms 56 with the base of the jack pivotally connected to one arm as at 65 and the extended end of the piston rod pivotally connected to the other arm as at 66 (Fig. 3). Pressure lines 67 and 68 lead to the jack through a coupling 69 on the tractor which is connected through fluid lines (not shown) to a fluid pump operated by the tractor engine. A control 70 (Fig. 2) mounted on the operator's platform operates suitable valve mechanism for selectively admitting fluid under pressure from the pump through the lines 67 or 68 to respectively extend or retract the jack.

It will be observed that the jack 64 is in extended condition when the frame sections are in normal operating position as shown in the drawings. While the arms 56 are held rigidly in their spread condition the wing sections 45 and the gangs 50 carried thereby are allowed limited floating movement as they move over the ground. This is due to the lost motion sliding connection between the crank arm 42 and lift rod 58. Collar 57 is allowed to slide freely on the rod 58 between the stop collars 60 and 61. Accordingly the side implement sections may raise and lower about the axis of the pivot tube 39. Upward movement is resisted by action of the compression spring 62 to prohibit bouncing of the sections and to assure ground working contact of the gangs 50.

The side sections of the implement may be raised to the positions shown in broken lines in Fig. 3 for transport or turning or to facilitate passage through gateways or the like. This is accomplished by actuation of control 70 to permit the passage of fluid under pressure to flow into the jack through line 68 and the release of pressure from line 67. As the piston is retracted in the jack the arms 56 are swung inwardly about their pivots 55. The pivoted lift rods 58 are pulled inwardly with stop 60 engaging the collar 57 to rotate crank arm 42 and tube 39 inwardly in bearings 37 and 38. This action swings the lift frames 45 to their folded vertical position shown in broken lines in Fig. 3. If transport position of the entire implement is desired the power hitch 14 is raised by rocking shaft 15 upwardly (Fig. 2) to lift the main section 24. Inasmuch as the side sections are mounted on the main sections they will, of course, be elevated further.

It is recognized that the pivotal mounting of side or wing sections on an implement frame for swinging movement to an inwardly folded collapsed position for transport is not in itself a new concept to the art. However, in heretofore known structures of this type, the side sections have been located in transverse alignment with the main section rendering use of the construction in power lifted draft frames impractical due to the excessive weight at the rear of the tractor. The present construction overcomes this problem by providing for location of the wing sections in advanced positions relative to the main section. The fore and aft pivot tubes 39 allow disposition of the wing sections at the sides of the tractor to greatly advance the overall center of gravity of the implement. The implement is in effect longitudinally balanced at the transverse line of connection with the hitch 14 or at the bracket 31. Only by so advancing the center of gravity of the implement can an implement carrying the increased weight created by the side wings be effectively used on a pick up hitch. It will be noted that in the construction shown the center of gravity of the wing sections lies forward of the tractor rear axle so as to actually offset the weight of the main section to give greater weight balance to the tractor implement combination than where the main section is used alone.

With the frame structure disclosed an implement has all of the advantages of mounting, flexibility, and ease of handling of other implements adapted to be mounted on pick up hitches. In addition the fore and aft balance of the frame section allows the implement to have an increased width for added ground coverage.

As hereinbefore set forth the frame may be used to carry other forms of ground working tools such as tools for hoeing, cultivating, spike or spring tooth harrowing and the like. It might well also be used for carrying planting units.

The invention accordingly provides an implement frame construction which economically and effectively carries out the aforementioned objectives. It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A tractor implement combination comprising a tractor, a power lifted trailing hitch on the tractor, a main implement section mounted at the rear of the tractor on the hitch for raising and lowering thereby between operating and transport positions, a pair of side implement sections disposed substantially forward of the main section one at each side of the tractor alongside the tractor rear wheels, support means for said side implement sections extending forwardly from each side of the main section and carrying said side sections, said support means providing a hinge connection between the main section and side sections for raising and lowering the side sections about generally fore and aft extending axes, and all of said sections having ground working tools mounted thereon.

2. A tractor-implement combination comprising a tractor, a center frame hitched to the tractor in trailing relation thereto and extending beyond the lateral limits of the tractor, a pair of elongated supports mounted one on each side of the center frame and extending in fore and aft directions, said supports extending forwardly a substantial distance beyond the front of the center frame and alongside the tractor rear wheels at each side of the tractor with the forward end portions of the supports lying forwardly ahead of the tractor rear wheel axis, and a pair of wing frames mounted one on each of said support forward end portions and extending laterally outward from the tractor with the center of gravity of the wing frames lying forward of said rear wheel axis, and the center frame and wing frames each having ground working tools mounted thereon.

3. In combination, a tractor having a power source and a power lifted trailing hitch, an implement comprising a main frame connected to the hitch in draft relation to the tractor for raising and lowering movement by the hitch, a pair of longitudinally extending pivot tubes mounted one on each side of the main frame, the forward portion of each tube extending alongside the tractor in laterally spaced relation thereto, said tubes being mounted on the main frame for oscillatory movement about longitudinal axes, a wing frame rigidily mounted on the forward portion of each tube and extending laterally outward from the tractor, an upright rocker arm on each tube, link means connecting each rocker arm to the power source on the tractor for raising and lowering the wing frames about said longitudinal axes, and said main frame and wing frames each having ground working tools mounted thereon for working engagement with the ground when the frames are in lowered position.

4. A tractor-implement combination comprising a tractor, a power lifted trailing hitch on the tractor, a main implement section mounted on the hitch for raising and lowering thereby between operating and transport positions, a pair of elongated pivot tubes journaled one on each side of the main section and extending forwardly beyond the main section and alongside the tractor, a side implement section mounted on each pivot tube forward of the main section, a rocker arm on each pivot tube, a transversely extensible and retractible power device mounted on the main section and operative from the tractor, and linkage connecting said device to the rocker arms on each tube for selectively rocking the tube about its longitudinal axis to raise or lower the side sections as the power device is operated.

5. The subject matter of claim 4 wherein said linkage includes a lost motion connection to allow free floating of the implement side section in lowered position when the power device is extended.

6. A frame construction for a tractor mounted implement comprising a main frame section adapted to be hitched to a tractor in trailing relation thereto, an elongated pivot tube journaled for oscillation on a fore and aft axis on one side of the main frame section and having a forward portion extending substantially forward of the main frame section, and a side frame section rigidly mounted on said tube forward portion and extending laterally outward therefrom for raising and lowering movement about the axis of the tube.

7. A frame construction for an agricultural implement adapted to be mounted on the power lifted trailing hitch of a tractor which comprises a center frame section, a hitch bracket mounted in transversely centered position on the center frame section for connection with the hitch, a pair of wing frame assemblies mounted one at each side of the center frame section in transversely spaced relation, said assemblies comprising a pair of wing frames disposed completely forward of the hitch bracket and extending laterally outward with respect to the center frame section, and means for mounting the wing sections on the center section for raising and lowering the wing sections about a fore and aft extending axis between operating and transport positions, said means including a pair of elongated supports mounted at the sides of the center section and having forward portions extending substantially beyond the hitch bracket and connected to the inner sides of the wing sections, and lifting linkage connected to each wing frame assembly and extending inwardly for operation of the linkage from a common station to raise and lower both wing sections.

8. In an agricultural implement a tool carrying main frame adapted to be hitched to a tractor in trailing relation thereto, said main frame having a pair of supports extending forwardly on longitudinal axes with the forward portions thereof lying substantially beyond the main frame, a tool carrying wing frame attached to each of said forward portions and extending laterally outward therefrom in operative positions, said supports connecting the wing frames to the main frame for upward swinging movement of the wing frames about the axes of said supports to upright transport positions, power lift means mounted on the main frame, and lifting linkage connecting the lift means to the wing sections for swinging the wing frames between operative and transport positions as the lift means is operated.

9. In a frame construction for an agricultural implement, a horizontally disposed center frame section, a pair of elongated support beams journaled one at each side of the center frame section for oscillating movement about their longitudinal axes, said support beams lying on a common plane and having corresponding end portions projecting substantially beyond the center frame section, a pair of side sections integrally attached one to each of said support beam end portions for oscillating movement with the beams between lowered positions coplanar with the main section and raised positions, each of said support beams having an integral crank arm thereon, power means on the main frame section, and link means connecting the power means to said crank arms.

10. A frame construction for a tractor mounted implement comprising a central frame section adapted to be mounted on a power lifted tractor hitch, a pair of transversely spaced longitudinally extending pivot tubes journaled for rotation one on each side of the central frame section and each having a forward portion lying ahead of the central frame section, a side frame section rigidly mounted on the forward portion of each pivot tube and extending laterally outward therefrom for raising and lowering movement about the axis of the tube, and a rigid bracing bar connecting each side section to a point near the rear end of its pivot tube.

References Cited in the file of this patent

UNITED STATES PATENTS

| | | |
|---|---|---|
| 1,035,286 | West | Aug. 13, 1912 |
| 1,780,644 | Dewend | Nov. 4, 1930 |